H. L. DUNCAN.
YIELDING COUPLING FOR DRIVING SHAFTS.
APPLICATION FILED MAR. 8, 1918.
1,277,300.
Patented Aug. 27, 1918.
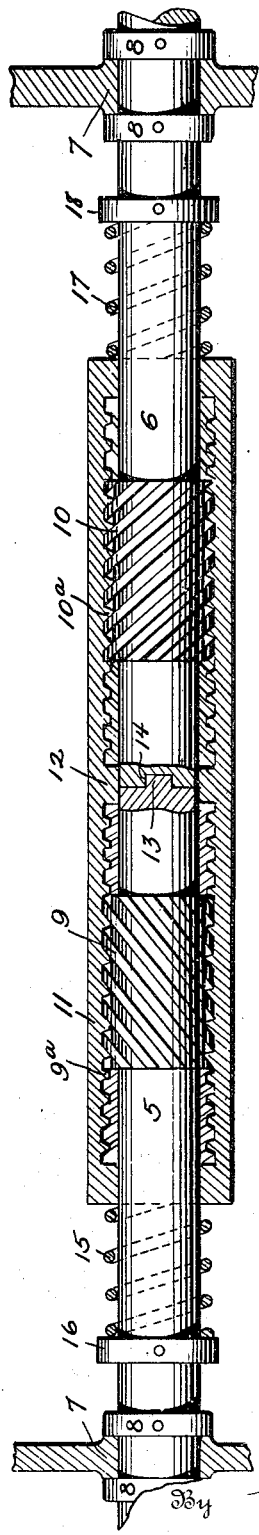

UNITED STATES PATENT OFFICE.

HERBERT L. DUNCAN, OF UNIONTOWN, KENTUCKY.

YIELDING COUPLING FOR DRIVING-SHAFTS.

1,277,300.

Specification of Letters Patent.

Patented Aug. 27, 1918.

Application filed March 8, 1918. Serial No. 221,257.

*To all whom it may concern:*

Be it known that I, HERBERT L. DUNCAN, a citizen of the United States of America, residing at Uniontown, in the county of Union and State of Kentucky, have invented certain new and useful Improvements in Yielding Couplings for Driving-Shafts, of which the following is a specification.

This invention relates to yielding couplings for driving shafts and its object is to provide an improved device of this character disposed within the length of a two part driving shaft and constructed in such manner as to impart a gradual starting movement to the driven section of said shaft from the driving section thereof.

The device forming the subject matter of the present invention is particularly adapted for use in conjunction with the driving shafts of automobiles though it is also of use in any relation where it is desired to cushion the movement of a driving shaft.

Further objects and advantages of the invention will be set forth in the detailed description which now follows.

The figure shown in the accompanying drawing is a longitudinal sectional view of a driving shaft constructed in accordance with the invention.

Referring to the drawing it will be seen that the driving shaft comprises a driving section 5 and a driven section 6. Suitable bearings 7 are provided for these sections and means are provided for holding the sections of the shaft against endwise movement in their bearings 7, such for example as collars 8. These bearings may be formed as part of the transmission case of an automobile change speed gearing. It makes no difference from the standpoint of the invention what particular use the coupling is put to since this coupling is of general application and for that reason it is thought sufficient to indicate bearings of a general character in which the sections 5 and 6 are mounted. The section 5 carries a screw thread 9 and the section 6 carries a screw thread 10 one of said threads being a right hand thread and the other of said threads being a left hand thread and said threads being engaged with internal threads 9$^a$ and 10$^a$ of a sleeve 11. The internally threaded portions 9$^a$ and 10$^a$ are separated by a stop collar 12 and the driving section 5 of the shaft carries a projection 13 which enters a recess 14 formed in the abutting end of the section 6 of the shaft. A spring 15 is disposed between one end of the sleeve 11 and a collar 16 carried by the section 5 of the shaft and a spring 17 is disposed between the opposite end of the sleeve and a collar 18 carried by the section 6 of the shaft.

If a turning movement be imparted to the driving section 5 of the shaft this will tend to impart an endwise movement to sleeve 11 in one direction or the other according to the direction of rotation of the section 5. If the rotation of the section 5 of the shaft is in such direction as to impart a movement toward the left to sleeve 11 such movement will compress spring 15 between sleeve 11 and the collar 16. This endwise movement of the sleeve 11 tends to rotate the section 6 in the direction of rotation of the section 5. However immediate movement of section 6 does not necessarily follow because, until the spring 15 has been compressed to a predetermined degree, sleeve 11 may have a rotation in a direction reverse to the rotation of the section 5. However there will come a time when the resistance of spring 15 to the endwise movement of sleeve 11 will result in a rotation of the section 6 in the direction of rotation of the section 5 and this movement will be a gradual one since the force exerted may be consumed in two directions, namely in a reverse rotation of sleeve 11 or in a forward rotation of section 6 though ultimately all of the force exerted will be devoted to driving the section 6 in the direction of movement of the section 5, both of these sections rotating at the same rate of speed. It is to be noted that the construction is such that either section 5 or section 6 may be the driven section and that reverse movement of the shaft will be cushioned equally as effectively as forward movement thereof.

It is to be understood that the invention is not limited to the precise construction set forth but that it includes within its purview whatever changes fairly come within the spirit of the appended claims.

Having described my invention what I claim is:

1. A coupling of the character described comprising a two part shaft, oppositely threaded portions upon said shaft, a sleeve engaged with said oppositely threaded portions and spring means resisting endwise movement of said sleeve with respect to the shaft.

2. A two part shaft comprising a driving section and a driven section, oppositely threaded portions carried by said sections, a sleeve having internal oppositely threaded portions for engagement with the oppositely threaded portions of the section of the shaft and spring means resisting endwise movement of said sleeve in either direction.

3. In a device of the character described a shaft comprising a driving section and a driven section, a projection carried by one of said sections and taking into a recess formed in the other of said sections, oppositely threaded portions carried by the respective sections, a sleeve engaged with said oppositely threaded portions, collars carried by the respective sections of the shaft and spring means disposed between said collars and the respective ends of the sleeve.

In testimony whereof I affix my signature.

HERBERT L. DUNCAN.